(12) United States Patent
Pelger et al.

(10) Patent No.: US 11,124,060 B2
(45) Date of Patent: Sep. 21, 2021

(54) PRESSURE VESSEL HAVING AN OUTLET FOR FUEL COLLECTED BETWEEN A LINER AND A FIBER-REINFORCED LAYER

(71) Applicant: Bayerische Motoren Werke Aktiengesellschaft, Munich (DE)

(72) Inventors: Andreas Pelger, Ismaning (DE); Hans-Ulrich Stahl, Munich (DE); Klaus Szoucsek, Haimhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 194 days.

(21) Appl. No.: 16/392,792

(22) Filed: Apr. 24, 2019

(65) Prior Publication Data
US 2019/0248229 A1 Aug. 15, 2019

Related U.S. Application Data

(63) Continuation of application No. PCT/EP2017/071431, filed on Aug. 25, 2017.

(30) Foreign Application Priority Data

Oct. 25, 2016 (DE) ...................... 10 2016 220 995.7

(51) Int. Cl.
*F17C 1/06* (2006.01)
*F17C 13/12* (2006.01)
(Continued)

(52) U.S. Cl.
CPC .......... *B60K 15/03006* (2013.01); *F17C 1/04* (2013.01); *F17C 1/06* (2013.01);
(Continued)

(58) Field of Classification Search
CPC ...... F17C 1/02; F17C 1/06; F17C 1/14; F17C 1/16; F17C 13/123; F17C 2203/0604;
(Continued)

(56) References Cited

U.S. PATENT DOCUMENTS 3,565,275 A   2/1971  Uto et al.
4,118,173 A * 10/1978  Shakiba ................. F23G 7/085
                                                126/307 A
(Continued)

FOREIGN PATENT DOCUMENTS

CN         2811735 Y      8/2006
CN       103069207 A      4/2013
(Continued)

OTHER PUBLICATIONS

Chinese-language Office Action issued in Chinese Application No. 201780064741.8 dated Jun. 23, 2020 with English translation (21 pages).
(Continued)

*Primary Examiner* — Andrew T Kirsch
(74) *Attorney, Agent, or Firm* — Crowell & Moring LLP (57) ABSTRACT

A pressure vessel stores fuel. The pressure vessel includes a liner, a fiber-reinforced layer, at least one end piece, and at least one outlet. The fiber-reinforced layer surrounds the liner, at least in some regions. The end piece is covered by the fiber-reinforced layer, at least in some regions. The at least one outlet is used to carry fuel that has collected in a boundary layer between the liner and the fiber-reinforced layer and is to be drained. The outlet surrounds the end piece, at least in some sections. The outlet is arranged and formed in such a way that the fuel to be drained escapes from the boundary layer into the outlet.

18 Claims, 5 Drawing Sheets

(51) Int. Cl.
*B60K 15/03* (2006.01)
*F17C 1/14* (2006.01)
*F17C 1/16* (2006.01)
*F17C 1/04* (2006.01)

(52) U.S. Cl.
CPC ............. *F17C 1/14* (2013.01); *F17C 1/16* (2013.01); *F17C 13/12* (2013.01); *F17C 13/123* (2013.01); *B60K 2015/03381* (2013.01); *F17C 2201/0109* (2013.01); *F17C 2203/0604* (2013.01); *F17C 2203/066* (2013.01); *F17C 2203/0619* (2013.01); *F17C 2203/0621* (2013.01); *F17C 2203/0639* (2013.01); *F17C 2203/0646* (2013.01); *F17C 2203/0663* (2013.01); *F17C 2205/0305* (2013.01); *F17C 2205/0335* (2013.01); *F17C 2221/012* (2013.01); *F17C 2221/033* (2013.01); *F17C 2223/0123* (2013.01); *F17C 2223/0153* (2013.01); *F17C 2223/033* (2013.01); *F17C 2223/036* (2013.01); *F17C 2225/0123* (2013.01); *F17C 2225/0153* (2013.01); *F17C 2225/033* (2013.01); *F17C 2225/035* (2013.01); *F17C 2250/0439* (2013.01); *F17C 2250/0443* (2013.01); *F17C 2250/0495* (2013.01); *F17C 2250/0636* (2013.01); *F17C 2260/037* (2013.01); *F17C 2260/038* (2013.01); *F17C 2260/042* (2013.01); *F17C 2270/0168* (2013.01); *F17C 2270/0184* (2013.01); *Y02E 60/32* (2013.01)

(58) Field of Classification Search
CPC ...... F17C 2203/0619; F17C 2250/0636; F17C 2260/042; F17C 2260/037; F17C 2260/038
See application file for complete search history.

(56) References Cited

U.S. PATENT DOCUMENTS

| | | | |
|---|---|---|---|
| 5,981,099 A * | 11/1999 | Bourbeau | H01M 2/1205 429/53 |
| 9,205,373 B2 | 12/2015 | Leavitt | |
| 2009/0057319 A1 | 3/2009 | Schlag | |
| 2010/0075200 A1 | 3/2010 | Hatta | |
| 2011/0315690 A1 | 12/2011 | Weisberg | |
| 2012/0018314 A1 | 1/2012 | Friedlmeier et al. | |
| 2012/0048865 A1 | 3/2012 | Eihusen et al. | |
| 2013/0174920 A1 | 7/2013 | Franzen et al. | |
| 2013/0277073 A1 * | 10/2013 | Helmsen | F23D 14/82 169/48 |
| 2013/0341235 A1 | 12/2013 | Leavitt | |
| 2014/0239001 A1 * | 8/2014 | Ulekleiv | F17C 1/06 220/589 |
| 2015/0274006 A1 | 10/2015 | Chung | |
| 2018/0172207 A1 | 6/2018 | Uehara et al. | |

FOREIGN PATENT DOCUMENTS

| | | |
|---|---|---|
| CN | 103339461 A | 10/2013 |
| CN | 104948902 A | 9/2015 |
| CN | 105299464 A | 2/2016 |
| DE | 1 551 606 A1 | 4/1970 |
| DE | 10 2008 039 573 A1 | 4/2009 |
| DE | 10 2008 053 244 A1 | 4/2010 |
| DE | 10 2009 042 401 A | 5/2010 |
| DE | 10 2010 033 597 A1 | 2/2012 |
| JP | 2008-190699 A | 8/2008 |
| WO | WO 2012/074815 A2 | 6/2012 |
| WO | WO 2013/083654 A2 | 6/2013 |
| WO | WO 2016/189664 A1 | 12/2016 |

OTHER PUBLICATIONS

International Search Report (PCT/ISA/210) issued in PCT Application No. PCT/EP2017/071431 dated Dec. 14, 2017 with English translation (seven (7) pages).

German-language Written Opinion (PCT/ISA/237) issued in PCT Application No. PCT/EP2017/071431 dated Dec. 14, 2017 (seven (7) pages).

German-language Search Report issued in counterpart German Application No. 10 2016 220 995.7 dated May 31, 2017 with partial English translation (12 pages).

* cited by examiner

Prior art

PRESSURE VESSEL HAVING AN OUTLET FOR FUEL COLLECTED BETWEEN A LINER AND A FIBER-REINFORCED LAYER

CROSS REFERENCE TO RELATED APPLICATIONS

This application is a continuation of PCT International Application No. PCT/EP2017/071431, filed Aug. 25, 2017, which claims priority under 35 U.S.C. § 119 from German Patent Application No. 10 2016 220 995.7, filed Oct. 25, 2016, the entire disclosures of which are herein expressly incorporated by reference.

BACKGROUND AND SUMMARY OF THE INVENTION

The technology disclosed here relates to a pressure vessel having an outlet for fuel accumulated between a liner and a fiber-reinforced layer.

Figure 1:
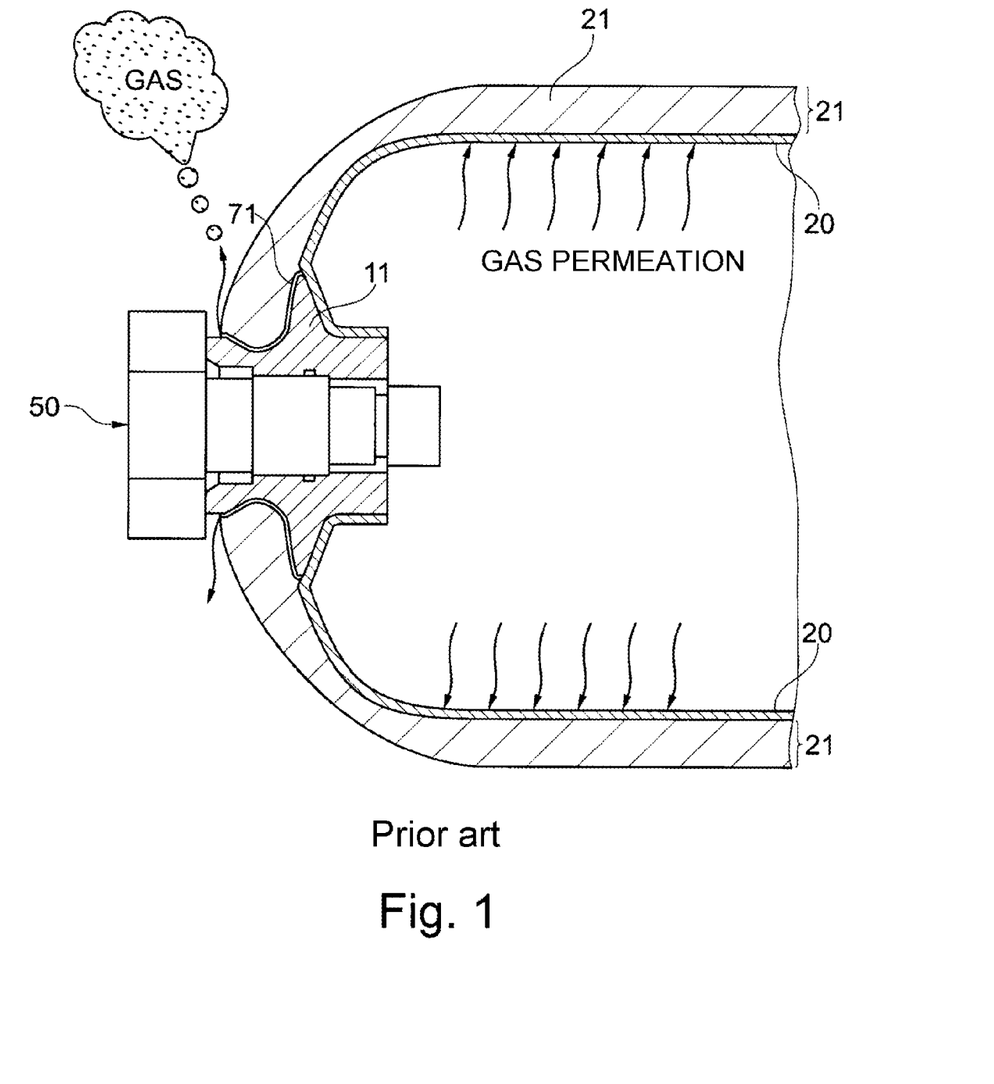
FIG. 1 is a schematic cross-sectional view of a pressure vessel according to the prior art.

Pressure vessels for storing fuel are known per se. Said pressure vessels typically comprise a liner 20 and a fiber-reinforced layer 21 which surrounds the liner 20 (cf. FIG. 1). It can arise that the liner 20 as compared to the fiber-reinforced layer 21 has a higher fuel permeation rate. Fuel can thus accumulate between the liner and the fiber-reinforced layer 21. In certain circumstances, this accumulation of fuel can escape through a gap 71 which could potentially be configured at the pressure vessel neck 11 (cf. FIG. 1 and FIG. 14 of the German patent application with the publication number DE 10 2009 042401 A1). As a remedy, it is proposed in DE 10 2009 042401 A1 that the liner is equipped with a gas interface.

It is a preferred object of the technology disclosed here to minimize or eliminate at least one disadvantage of the previously known solutions, or to provide an alternative. It is in particular an object of the technology disclosed here to avoid, or to better control, respectively, comparatively large quantities of combustible gases which from the interface between the liner and the fiber-reinforced layer escape by way of the pressure vessel neck into the installation space of the pressure vessel. Further preferred objects can be derived from the advantageous effects of the technology disclosed here.

The technology disclosed here relates to a pressure vessel for storing fuel that is gaseous under environmental conditions. The pressure vessel can be used, for example, in a motor vehicle which is operated with compressed natural gas (CNG) or liquefied natural gas (LNG) or with hydrogen. The pressure vessel can be, for example, a cryogenic pressure vessel (CcH2) or a high-pressure gas vessel (CGH2). High-pressure gas vessels are configured for permanently storing fuel substantially at environmental temperatures at a nominal operating pressure (also referred to as nominal working pressure or NWP) of approx. 350 bar (positive pressure in relation to the atmospheric pressure), more preferably of approx. 700 bar or more. A cryogenic pressure vessel is suitable for storing the fuel at the aforementioned operating pressures even at temperatures which are significantly below the operating temperature of the motor vehicle.

The pressure vessel has a liner. The liner configures the hollow body in which the fuel is stored. The liner can be produced from, for example, aluminum or steel, or from alloys thereof. The liner can furthermore preferably be produced from a plastics material.

The pressure vessel has at least one fiber-reinforced layer. The fiber-reinforced layer can surround a liner at least in regions, preferably completely. The fiber-reinforced layer is often also referred to as the laminate, casing or armor, respectively. Fiber-reinforced plastics material (also abbreviated as FRP or FRC), for example carbon-fiber-reinforced plastics material (CFRP) and/or glass-fiber-reinforced plastics material (GFRP) are typically used as the fiber-reinforced layer. The fiber-reinforced layer expediently comprises reinforcement fibers that are embedded in a plastics-material matrix. The matrix material, the type and proportion of reinforcement fibers as well as the alignment of the latter can in particular be varied in order for the desired mechanical and/or chemical properties to be established. Continuous fibers which can be applied by wrapping and/or braiding are preferably used as reinforcement fibers.

A breather layer can be provided between the liner and the fiber-reinforced layer. The breather layer can in particular be configured so as to be gas-permeable in such a manner that fuel that is defused by the liner can flow into other regions, for example in the direction of the ends of the pressure vessel. To this end, the breather layer can configure microducts or microgaps, for example. However, such a breather layer does not have to be provided. Said breather layer in this instance can conjointly configure the interface disclosed here between the liner and the fiber-reinforced layer.

The pressure vessel disclosed here furthermore includes at least one end piece which is configured at one end and preferably at both ends of the pressure vessel. The end piece on at least one end has at least one fluid passage for the fuel. The other end in this instance typically does not have any fluid passage. The pressure vessel is filled and/or fuel is retrieved from the pressure vessel through the at least one fluid passage. To this end, an end-piece opening into which a valve unit (on-tank valve—OTV) is inserted, in particular screw-fitted, is typically provided. The end piece can be a separate component (in this instance often referred to as a boss). Alternatively, however, the end piece can also be configured as part of the liner, or so as to be integral thereto, respectively. The end piece comprises a neck which in the installed state typically leads out of the pressure vessel, as well as a part that in the axial direction of the pressure vessel widens into the pressure vessel. The end piece is preferably made from a metal material, for example aluminum.

The fiber-reinforced layer disclosed here can at least in portions directly or indirectly cover the end piece disclosed here. The fiber-reinforced layer can at least in regions bear directly on the end piece. Alternatively, at least one layer can also be disposed between the end piece and the fiber-reinforced layer. For example, in one design embodiment, the liner or a breather layer can also be disposed at least in regions between the fiber-reinforced layer and the end piece.

The pressure vessel disclosed here furthermore has at least one outlet, which is configured for discharging fuel that has permeated, or accumulated, or is accumulated and to be drained (hereunder in a simplified manner: "fuel to be drained") in an interface between the liner and the fiber-reinforced layer.

The outlet can in particular be disposed and configured in such a manner that no thermal damage to the pressure vessel and/or thermal damage that is minor in comparison to a pressure vessel without an outlet arises on account of the exit of the fuel to be drained.

The probability of any thermal influence on components of the pressure vessel or components neighboring the latter can thus be at least further minimized.

The outlet can be configured and disposed on the end piece in such a manner that no flame(s) can be created and/or be maintained at least in the proximity of the fiber-reinforced layer, preferably at the entire outlet, in the exit of the fuel to be drained to the environment of the pressure vessel.

The feature "no flame(s) can be created and/or be maintained" in this context in the case of the technology disclosed here means that no flames are formed when the fuel exits the outlet and/or that, even when a flame has been formed by virtue of further influences, the fuel exiting the outlet cannot further maintain said flame. The outlet can preferably be specified in such a manner that the fuel by virtue of the pressure differential between the environmental pressure and the fuel pressure in the interface can escape from the interface so fast that a pressure differential between the fuel pressure in the interface and the internal pressure vessel pressure is lower than a limit differential pressure. The limit differential pressure between the fuel pressure in the interface and the internal pressure vessel pressure herein can be the pressure beyond which the risk of the liner being released, or the liner bulging into the interior of the pressure vessel, respectively, exists. This material preferably configures a surface by way of which the fuel escapes.

The outlet, in particular the at least one outflow opening disclosed here, can preferably be configured in such a manner that the mass flow of fuel remains below a limit value at which maintaining a flame by exiting fuel in air is possible. This limit value, referred to as the "flame quenching limit" first depends on the geometry of the outflow opening (cf. Butler et al. "*Limits for hydrogen leaks that can support stable flames*" in International Journal of hydrogen energy 34 (2009) 5174-5182). For example, said limit value for hydrogen is 3.9 μg/s for an optimized burner geometry with ideal conditions, and approximately 28 μg/s for leakages from compression screw fittings. When the mass flow undershoots the value for the optimized burner geometry, a flame which is maintained by virtue of the outflowing fuel is thus reliably excluded. Said mass flow thus represents the limit value for a conservative embodiment.

When the hydrogen mass flow for one outlet opening is thus maintained below the limit value of 3.9 μg/s, the formation of a flame can thus be advantageously avoided. The plurality of outflow openings disclosed here are preferably configured in such a manner that the hydrogen flows exiting the individual outflow openings have in each case a mass flow below the limit value of 3.9 μg/s. The plurality of outflow openings are preferably spaced apart such that no interaction of the respective hydrogen flows (with increased concentration) exiting the individual outflow openings arises. The formation of flames can advantageously be minimized or excluded, respectively, here too.

The outlet herein can be guided completely or else only partially about the end piece, preferably about the neck of the end piece. The outlet can preferably be disposed so as to be concentric with the end piece. The outlet can be provided at one end of the pressure vessel or else preferably at both ends, also referred to as domes. The specific geometry of the outlet can vary in the plan view as well as in the cross section, and can in particular deviate from a closed annular shape. For example, clearances in the pressure vessel wall that are disposed so as to lie around the neck of the end piece can be considered an outlet (in this instance here as an outlet sunk into the pressure vessel wall), despite said clearances not having any closed annular shape and/or not representing a separate component.

The pressure vessel can be designed such that fuel accumulated in the interface flows into the outlet at at least one fuel exit location. The fuel exit location can in particular be provided on the external surface of the fiber-reinforced layer, in particular between the fiber-reinforced layer and the end piece. If no outlet covering the fuel exit location were to be provided, the fuel could escape into the environment at the fuel exit location. The outlet, for discharging fuel that has accumulated in the interface between the liner and the fiber-reinforced layer and is to be drained, can in particular be specified so as to establish a fluidic connection between said interface and the at least one outflow opening disclosed here.

The outlet can also be configured so as to be integral to the end piece. The outflow opening disclosed here can be provided in the neck of the end piece that leads out of the pressure vessel. The at least one outlet can preferably be provided as a collar or casing, respectively, or as a collar portion (hereunder in a simplified manner: "collar"), respectively. The collar preferably surrounds the end piece, in particular the neck of the end piece, from the outside. The collar herein can bear directly or indirectly on or against, respectively, the wall of the pressure vessel, preferably on the external side of the fiber-reinforced layer. Consequently, any potential cover layers could at least in regions also be disposed between the fiber-reinforced layer and the collar. The collar can in particular be configured for minimizing any deformation of the fiber-reinforced layer in a direction away from the liner. The collar, at least in portions, particularly preferably bears in a sealing manner on the pressure vessel wall, or on the external side of the fiber reinforced layer, respectively. A sealing element herein can at least in portions be provided between the collar and the fiber-reinforced layer, respectively. The sealing element in terms of the material and the dimensions is designed such that said sealing element can equalize the deformations and/or displacements between the fiber-reinforced layer and the end piece, and maintain the sealing effect of said sealing element, across the entire pressure range and temperature range of the pressure vessel.

The outlet disclosed here expediently does not interfere with the on-tank valve. The latter can be replaced independently of the outlet. The outlet furthermore does not have any negative influence on the tightness of the screw-fitting of the on-tank valve. A comparatively simple, cost-efficient and/or space-saving construction is disclosed. The outlet engages on the fiber-reinforced layer from the outside. The probability that clogged drainage ducts lead to the fuel seeking another path out of the pressure vessel is thus reduced. Overall the reliability can be increased here.

The outlet or collar, respectively, shown here can be disposed such that the matrix material, in particular during the production of the fiber-reinforced layer, cannot clog the flow ducts of the outlet or of the collar, respectively.

In one design embodiment of the technology disclosed here, the outlet or the collar, respectively, can at least partially be disposed in a clearance of the pressure vessel wall, preferably of the fiber-reinforced layer.

The pressure vessel disclosed here, the outlet disclosed here, and/or the outflow opening disclosed here, can have at least one flame trap, or at least one flame arrester, respectively, which prevents the passage of a flame. Flame traps or flame arresters, respectively, are known per se and are used in, for example, Bunsen burners, pit lights, or gas hobs. For example, a mode of action of flame arresters is based on a flame front being cooled by installations or flow ducts, respectively, to the extent that a flame cannot continue to propagate behind the flame arrester. Cross section-to-length ratios in the outlet of the fluid duct of the fuel which prevent the passage of a flame can be provided.

For example, a gap in the outlet, in particular in the collar disclosed here, having a maximum gap width which is less than the experimentally ascertained maximum limit gap width of the fuel can be provided. The outlet is preferably configured in such a manner that the maximum gap width of the outlet is smaller than 0.64 mm. It can thus be avoided that a flame formation arises within the outlet, in as far as the pressure vessel is filled with hydrogen. The experimentally ascertained maximum limit gap width (also referred to as the maximum experimental safe gap—MESG) is the maximum spacing between two flat plates at which the propagation of flames (also in the context of explosions) by way of the gap is still just possible. Said limit gap width in the case of hydrogen is 0.08 mm. The flame-quenching gap, or quenching gap, is the spacing between two flat plates at which the ignition of a fundamentally ignitable gas mixture in air is still just suppressed. Said flame-quenching gap in the case of hydrogen is 0.64 mm. The MESG, by virtue of the explosion pressure, is always tighter than the quenching gap. The limit gap width for the technology disclosed here is expediently the quenching gap.

The outlet or the outflow opening, respectively, preferably comprises a heat-resistant material, at least in the region in which the fuel to be drained exits to the environment. In one embodiment, the outlet or the outflow opening, respectively, can be made from a material, in particular a metal material (metal or metal alloy, respectively) which has a melting temperature that is higher than the combustion temperature of the fuel. The combustion temperature or else flame temperature, for example for a natural gas flame in air, is 1970° C., and for a hydrogen flame in air is at most 2130° C. In a conservative embodiment a metal having a melting temperature which lies above said respective values can thus be used in each case, such as, for example, tungsten having a melting temperature of above 3400° C. It is thus ensured that the outlet also flawlessly functions in the case in which a flame is configured at the draining location. A metal material furthermore facilitates the cooling of the combustion gas and thus increases the capability of the outlet in terms of an arrester.

It can be demonstrated by experiments and/or thermal simulations that the maximum temperatures of the outlet on account of the cooling effect are always significantly below the flame temperature, such that the melting temperature of the metal at the outlet in practice can also be lower without functional deficiencies arising.

The end piece and the outlet can thus advantageously be formed from metal. This has a positive effect on the property as a flame trap. Furthermore, the risk of plastics material flowing into the outlet flow ducts is reduced. Ceramics can furthermore also be considered. Said ceramics typically have a very high temperature resistance.

The at least one outlet can have at least one outflow opening or a multiplicity of outflow openings (hereunder for simplification referred to as "at least one outlet opening") through which the fuel to be drained can exit to the environment. The outflow opening geometry of the at least one outflow opening herein can be designed such that no flame(s) can be created and/or be maintained. The at least one outflow opening is preferably configured as a Venturi nozzle or as a suction jet pump. Such a nozzle is capable of suctioning ambient air simultaneously with the exiting of the fuel, on account of which an advantageous mixing of fuel and ambient air can be achieved. The at least one outflow opening can advantageously be configured as a flame trap or as a flame arrester, respectively.

The pressure vessel disclosed here, in particular the outlet, can advantageously have a multiplicity of outflow openings through which the fuel to be drained exits to the environment. In one preferred design embodiment, the outflow openings can be mutually spaced apart in such a manner that no flame(s) can be created and/or be maintained at the outflow openings. The spacing of the outflow openings can in particular be chosen such that no interaction of the hydrogen outflows can arise in such a manner that the hydrogen outflows, which individually are not combustible, can be unified such that combustible hydrogen outflows are created.

The at least one outflow opening can be configured by at least one plastics material which preferably can be hydrogen-permeable and water-tight.

A valve can be provided at the at least one outflow opening. The at least one valve can be configured for controlling in an open-loop or closed-loop manner the outflow of fuel. The valve is preferably a passive valve, in particular a purely mechanical valve. The at least one valve can expediently drain the fuel to the environment, in particular when a pressure limit value in the fuel-conducting region is exceeded. The at least one valve can in particular be configured as a non-return valve which suppresses a return flow of fuel and the ingress of ambient air into a fuel-conducting region. The valve can comprise an elastic layer, for example. The elastic layer can be configured for releasing the at least one outflow opening when the pressure in the fuel-conducting region exceeds the pressure limit value. A multiplicity of outflow openings can advantageously be provided in the elastic layer. For example, perforations or holes, respectively, which are closed at atmospheric pressure and which open beyond the pressure limit value, for example 1.5 $bar_{pos}$ (thus 1.5 bar positive pressure in relation to the atmospheric pressure), preferably 0.5 $bar_{pos}$, and particularly preferably 0.1 $bar_{pos}$, can be provided in the elastic layer.

In one advantageous design embodiment of the technology disclosed here, the at least one outlet in the fuel exit area thereof at least in regions comprises a fuel-permeable material, or a material that is permeable to fuel, respectively. The material per se is thus fuel-permeable. This includes, for example, porous materials, metal-fiber materials, and/or membranes. Such materials have a substantially homogenous fuel permeability which varies (for example, as a result of production tolerances) to an extent which is negligible in terms of the function. For example, an inherently fuel-permeable material in which macroscopic exit ducts (for example having a diameter>1 mm) have subsequently been incorporated is not a fuel-permeable material. The fuel can exit at the fuel exit area such that no flame can be created and/or be maintained. The fuel-permeable material here configures the multiplicity of outflow openings.

The membrane in one design embodiment can be configured in such a manner that said membrane is permeable to fuel (for example hydrogen) and is substantially impermeable (that is to say with the exception of negligibly minor quantities) to at least one reactant of the fuel, in particular ambient air. Advantageously no reactant (for example oxygen) from the environment can thus make its way into the interior space disclosed here from the outlet.

The fuel exit area can be at least 50 $cm^2$, preferably at least 100 $cm^2$, in particular preferably of at least 400 $cm^2$. The fuel exit area can in particular be of the same magnitude as the liner surface. The material can be configured for distributing the fuel and/or for limiting the exit of fuel to the environment. The material is in particular suitable for decreasing the mass flow of fuel, or to distribute the latter to a sufficiently large area, respectively, such that no flame(s) can be created and/or be maintained, even during a shock-like discharge of the fuel from the interface. The material can in particular limit the area-specific fuel exit in such a manner that the area-specific mass flows passing through said materials (in particular during the discharge) are minor such that no flame(s) can be created and/or be maintained. The material and the fuel exit area to the environment are thus expediently chosen such that the maximum fuel mass flow which can arise during a discharge lies below fuel mass flow limit value which can maintain a fuel flame and/or permit the latter to be created.

The metal fiber material is preferably configured as a woven fabric, warp/weft knitted fabric, or as a nonwoven, respectively. The porous material can be, for example, an open-pore material, preferably a porous metal material, and particularly preferably a sintered material. The membrane is preferably hydrogen-permeable and water-tight. For example, a plastics-material membrane, in particular a polymer membrane, which can likewise be configured as an elastic layer as is disclosed here, can be used.

The at least one outflow opening and/or the fuel exit area can be spaced apart from the external surface of the fiber-reinforced layer toward the outside and the environment by at least 10 mm, preferably at least 20 mm. The probability of the exiting fuel thermally acting on the fiber-reinforced layer can thus be reduced.

The outlet can be configured for at least partially catalytically converting the fuel to be drained. To this end, the outlet can comprise a catalytic material which is expediently fluidically connected to the ambient air. Fuel exiting from the interface can thus advantageously at least be partially catalytically converted before said fuel exits to the environment.

The outlet can be configured for at least partially and at least temporarily receiving fuel to be drained by sorption. The term "sorption" herein, comprises absorption and adsorption. Adsorption is a physical process in which substances (typically molecules) keep adhering to the surface of another substance and are enriched on the surface of said other substance. Chemical absorption describes the process of receiving or "diffusing" an atom, molecule, or an ion in another phase. This herein is not an accumulation on the surface (adsorption) but a reception in the free volume of the absorbing phase. In other words, a fuel sorption reservoir which is configured for storing and later dispensing the fuel to be drained can be provided. The fuel sorption reservoir can be configured for receiving at least so much of the fuel mass flow that the mass flows arising during the partially shock-like discharge in the interface are reduced to the extent that the fuel quantities that instantaneously exit to the environment at the outlet are below an emission limit value.

At least one fuel sorption reservoir can be disposed in the outlet, said fuel sorption reservoir in the installed state on or in the pressure vessel, respectively, being capable of being at least partially passed by an encircling flow of gas, or a throughflow of gas, in particular ambient air. The outlet can in particular be disposable or disposed, respectively, in a motor vehicle in such a manner that the fuel sorption reservoir in the case of a traveling motor vehicle can be passed by an encircling flow of an air stream generated by the travel, or by a throughflow of an air stream generated by the travel, respectively. A self-cleaning system which drains the fuel at a point in time which is particularly suitable for the draining of fuel, specifically during travel, is thus provided. The fuel sorption reservoir is preferably at least partially, preferably completely, disposed outside the fiber-reinforced layer.

The technology disclosed here furthermore includes a device for increasing the flow rate at which oxidants, inert gas, and/or ambient air flows to the outlet, in particular
(a) to the at least one outflow opening;
(b) to the at least one gap;
(c) to the fuel-permeable material; and/or
(d) to the fuel sorption reservoir.

The components a. to d. are not explicitly stated hereunder. Nevertheless, said specific embodiments are to be included when the throughflow or encircling flow from the outlet, respectively, is described. The device for increasing the flow rate can comprise:
a diversion of ambient air during the travel of the motor vehicle;
a compressed air reservoir; and/or
an oxidant conveyor, in particular an air conveyor.

In one design embodiment, at least one oxidant conveyor can be specified for conveying the oxidant such that the outlet can at least be partially passed by an encircling flow and/or at least be partially passed by a throughflow.

To this end, the oxidant conveyor of the fuel cell system can be used, for example. The oxidant conveyor of the fuel cell system is specified for providing the oxidant for the cathode of the fuel cell system. For example, a branch which establishes a fluidic connection between the oxidant conveyor of the fuel cell system and the outlet can be provided in the cathode air intake of the fuel cell system, or in a fuel cell bypass at the cathode.

The pressure vessel, or a pressure vessel system, respectively, can include at least one flow modification element which can modify the at least partial encircling flow and/or at least partial throughflow, in particular so as to be based on a signal of a control apparatus. The flow modification element can be a flap or a valve. For example, the flow modification element can be disposed in the fluidic connection between the oxidant conveyor and the fuel sorption reservoir, in particular downstream of the branch. However, the flow modification element can likewise be used in the design embodiment having an ambient air with an encircling flow, for example so as to divert said ambient air.

The pressure vessel disclosed here furthermore preferably includes at least one detection installation for detecting the fuel to be drained. The detection device is configured for detecting a temperature variation of the fuel sorption material. The detection installation can furthermore be specified for ascertaining from the temperature variation a value which is indicative for the leakage of the pressure vessel. The leakage herein can be traced back to the liner being permeated by the fuel or else two other liner leakages which are discharged through the outlet, or through the fuel sorption reservoir, respectively. The value can represent, for example, a quantity of an escaping fuel mass flow, preferably the quantity of fuel per time unit stored and/or dispensed in the fuel sorption reservoir.

The detection device disclosed here can expediently be specified for controlling in a closed-loop and/or open-loop manner the flow modification element and/or the oxidant conveyor. For example, the flow modification element and/or the oxidant conveyor can be operated in such a manner that the outlet in first temporal periods is at least partially passed by an encircling flow of oxidant or at least partially passed by a throughflow of oxidant, respectively, and in the second temporal periods is not passed by an encircling flow or passed by a throughflow, respectively. Fewer contaminations thus make their way into the outlet, and/or the air resistance of the vehicle and/or the energy requirement of the vehicle is/are lower.

The first temporal periods herein can be fixed temporal spacings, for example. Alternatively, the first and second temporal periods can be a function of the fuel in the sorption reservoir. For example, the sorption reservoir can be purged beyond a specific fuel quantity in the fuel sorption reservoir.

The detection device per se can include a control apparatus. Alternatively or additionally, another control apparatus can assume said task and/or further control tasks of the technology disclosed here.

The technology disclosed here furthermore comprises a method for discharging fuel that has accumulated between the liner and the fiber-reinforced layer of the pressure vessel and is to be drained. According to the method disclosed here, the fuel to be drained is temporarily stored in the fuel sorption reservoir.

The method can comprise the step according to which the fuel sorption reservoir is at least partially passed by an encircling flow of ambient air, or is passed by a throughflow of ambient air, respectively, such that the fuel sorption reservoir successively dispenses the temporarily stored fuel to the ambient air.

The method can comprise the step according to which the fuel sorption reservoir of the pressure vessel disposed in the motor vehicle is passed by an encircling flow of an air stream, or by a throughflow of an air stream, in such a manner that the fuel sorption reservoir dispenses fuel to the ambient air.

The method disclosed here can comprise the step according to which the at least one oxidant conveyor conveys the oxidant such that the fuel sorption reservoir is at least partially passed by an encircling flow and/or is at least partially passed by a throughflow. The method disclosed here can comprise the steps of:

detecting a signal which is indicative for the fuel to be drained and/or for the pressure vessel internal pressure; and modifying the at least partial encircling flow and/or the at least partial throughflow, based on the signal detected.

The temporal profile of the pressure vessel internal pressure can in particular be used herein for generating an estimate of the fuel to be drained. The permeation through the wall of the liner per se is thus firstly proportional to the pressure differential between the liner internal side and the liner external side. On the other hand, in the case of comparatively high pressure vessel internal pressures, the outflow of the hydrogen accumulated between the liner and the CFRP armor can be fully or partially blocked and released only at lower pressures.

The oxidant to be fed to the fuel sorption reservoir is preferably filtered, preferably by an air filter upstream of the oxidation filter of the fuel cell system.

The methods disclosed here can comprise the steps of:
detecting a temperature variation of the fuel sorption reservoir; and
determining the value which is indicative for the leakage of the pressure vessel.

The technology disclosed here furthermore comprises a method for producing the pressure vessel disclosed here, said method comprising the steps of:
applying the fiber-reinforced layer (120) to the liner (110); and
attaching at least one outlet (150) to the end of the pressure vessel such that the outlet (150) bears directly or indirectly on the external side of the fiber-reinforced layer (120), preferably after the fiber-reinforced layer (120) has been cured.

In other words, the technology disclosed here relates to a pressure vessel in which the fuel mass flows escaping to the environment of the bosses can be trapped at one or both sides/ends of the pressure vessel, in each case by a heat-resistant device which possesses local outflow openings, similar to those of burners in the case of gas hobs. The exact geometry of the device, in particular the number and the size of the outflow opening(s) and the internal volume of the device, can be dimensioned such that no flames can be created within the device, thus close to the CRFP. When the volume is sufficiently tightly delimited, a flame cannot result, or a flame cannot propagate, respectively, in the case of any fuel/air mixture since the cooling by way of the surrounding walls extracts more heat from the combustion than would be required by the flame for propagating. A limit gap width according to the "quenching gap" can in particular be provided.

The device preferably includes at least one outflow opening which can be configured as a nozzle and in the manner of a Venturi nozzle entrains the air oxygen across the range of the mass flows to be drained. The location of the combustion and the alignment of the outflow opening(s) can be chosen such that the installation, the pressure vessel, and/or the remaining vehicle, are not compromised in any manner in the unlimited duration of the fuel exit and in terms of all relevant mass flows. Alternatively, the leakage at the end pieces, or the bosses, respectively, can be distributed by way of a fibrous material, preferably by way of a mesh-type woven fabric, warp/weft knitted fabric, or nonwoven having a random structure, and particularly preferably from a metal fiber material (for example steel wool). Alternatively or additionally, porous sintered metals can in particular serve for distributing the hydrogen mass flows. On account thereof, the exit location of the fuel is repositioned (that is to say away from the fiber/plastics-material composite), on the one hand, and the local mass flows (per exit location) are reduced to below a "ignitable" and permanently flame-forming value (the flame is self-maintaining). A material having a high thermal conductivity, in particular a higher conductivity than the fiber-reinforced layer, can additionally serve as the flame trap or the flame arrester, respectively, or amplify the effect of the flame trap, respectively. A flame, should said flame be created, could in this instance not propagate up to the fuel exit location. It can advantageously be provided for potentially existing flame front to be cooled by the installations mentioned to the extent that a flame cannot propagate into the region behind the flame arrester.

Alternatively or additionally, the "casing" of the exit location can be clad by a fuel sorption material, for example an adsorber material such as active carbon, or a metal hydride powder. Said fuel sorption material can trap the fuel leakage in the case of a stationary vehicle (when parking, standing, filling), for example. The fuel sorption material, when traveling, is subsequently passed through by a flow of fresh air. The embedded fuel, on account of this throughflow, is desorbed again. The desorption flows of fuel that arise in the case of this purging are so minor in comparison to the encircling flow, or throughflow, respectively, of air that the purging gas exits the fuel sorption material having a comparatively minor concentration of fuel.

The exit position of the fuel to the environment can expediently be disposed so as to be spaced apart from ignition sources and/or thermally sensitive components in such a manner that no interaction, or only a minor interaction, can arise between the exit and the ignition sources, or the thermally sensitive components, respectively. The exit position is preferably provided at a well ventilated location, or a location that is better ventilated in comparison to the pressure vessel (in particular as compared to the end pieces thereof), respectively.

After flowing through the adsorber, the air mass can optionally be returned to the hydrogen consumer (combustion engine, fuel cell). This principle is thus similar to that of the active carbon filter which in the case of the conventional fuel supply system is used for avoiding emissions. The sorption reservoir disclosed here, for example an absorption filter, could also serve as a detection unit. Since the processes of adsorption and desorption proceed in an exothermic or endothermic manner, respectively, any leakage could be detected directly or indirectly by way of a temperature measurement, inter-alia while considering the ambient temperature, or the temperature of the inflowing air, respectively. This detection of fuel can in very general terms also be a suitable means for identifying leakages in the case of other leaks.

An active throughflow by means of a fan, a pump, or vacuum (air suctioning of the compressor—similar to the purging of the active carbon filter in the case of a gasoline tank) can be provided. It can moreover be expedient for the throughflow to be controlled in an open-loop/closed-loop manner by active flaps, for example the sorption reservoir is passed by a throughflow only in the case of tank pressures at which little hydrogen leakage through the breather layer is expected, and the sorption reservoir is thus regenerated. The advantage herein is that the air throughput and thus the "introduction of contamination" is limited. Of course, a filter for protecting the sorption reservoir when purging can also be provided. The detection device disclosed hereunder can control in an open-loop/closed-loop manner the active elements.

The at least one outflow opening can in particular be configured as a flame trap. The outflow opening, or the outlet, respectively, are preferably configured so as to be heat-resistant. The outflow opening, or the outlet, respectively, can expediently be configured from a metal material (metal or metal alloy, respectively). The outlet can also be configured so as to be integral to the end piece. The outlet for discharging fuel that has accumulated in the interface between the liner and the fiber-reinforced layer and is to be drained, can in particular be specified so as to establish a fluidic connection between said interface and the at least one outflow opening. The outflow opening can preferably be provided in the neck of the end piece that leads out of the pressure vessel. The at least one outflow opening can preferably be disposed and oriented such that the fuel to be drained flows from the at least one outlet opening so as to flow away from the external surface of the fiber-reinforced layer, for example in that said fuel initially flows out in a manner coaxial with the pressure vessel longitudinal axis A-A, or else at an acute angle to the latter.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 2:
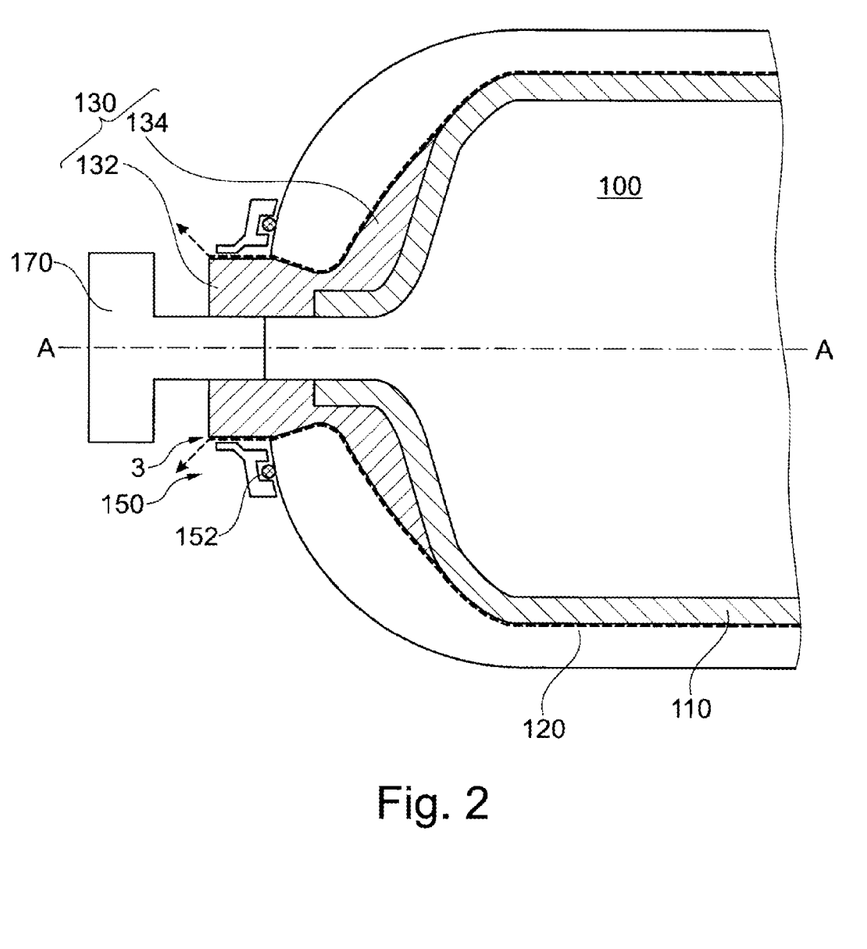
FIG. 2 is a schematic cross-sectional view of a pressure vessel 100.

FIG. 2 schematically shows the pressure vessel 100. The pressure vessel includes the liner 110 which is enclosed by a fiber-reinforced layer, or armor 120, respectively. An end piece 130 is disposed in the dome region here, one end of the liner 110 bearing on the internal side of said end piece 130. The end piece 130 has a neck 132 in which an on-tank valve 170 is screw-fitted. To this end, an outflow opening having an internal thread in which a thread of the on-tank valve 170 engages is provided in the end piece 130. The at least one filling and retrieval line which protrudes into the interior of the liner 110 is not shown here. The end piece 130 furthermore has a widening region 134, the one side thereof bearing on the liner 110 and the other side thereof here being completely surrounded by the fiber-reinforced layer 120. The fiber-reinforced layer 120 here bears tightly on the widening region 134. The end piece 130 can be produced from aluminum, for example. It is likewise contemplated that the technology disclosed here is applied to a pressure vessel 100 in which the end piece 130 and the liner 110 have been produced so as to be integral, for example in one production process step.

Fuel, here hydrogen, which slowly travels along the interface between the liner 110 and the fiber-reinforced layer 120 toward the dome accumulates between the liner 110 and the fiber-reinforced layer 120 (hydrogen is shown in dashed lines). The hydrogen in the region of the dome penetrates between the fiber-reinforced layer 120 and the widening region 134, and thus gradually makes its way to the neck 132 of the end piece 130. An outlet 150, here configured as a collar, is provided on the neck 132 of the end piece 130. The collar 150 encloses the neck 132 in an annular manner. In one preferred design embodiment, the collar 150 is fastened to the neck external side by a bayonet fastener or by a screw fitting (not illustrated here). The collar 150 can have at least one outflow opening 3. The outflow opening 3 here is configured as a gap having a specific length and a specific gap width. The gap length and the gap width here are chosen such that the outflow opening here acts as a flame trap or flame arresters, respectively. In other words, the gap width and length are chosen such that potential flames forming in the interior of the collar 150 cannot make their way outside and/or potential flames on the external side of the collar 150 cannot make their way into the interior of the collar 150. No flames can thus be created and/or existing flames can thus no longer be maintained.

A seal 152 which bears on the external face of the fiber-reinforced layer 120 is provided here for sealing the interior space of the collar 150.

Figure 3:
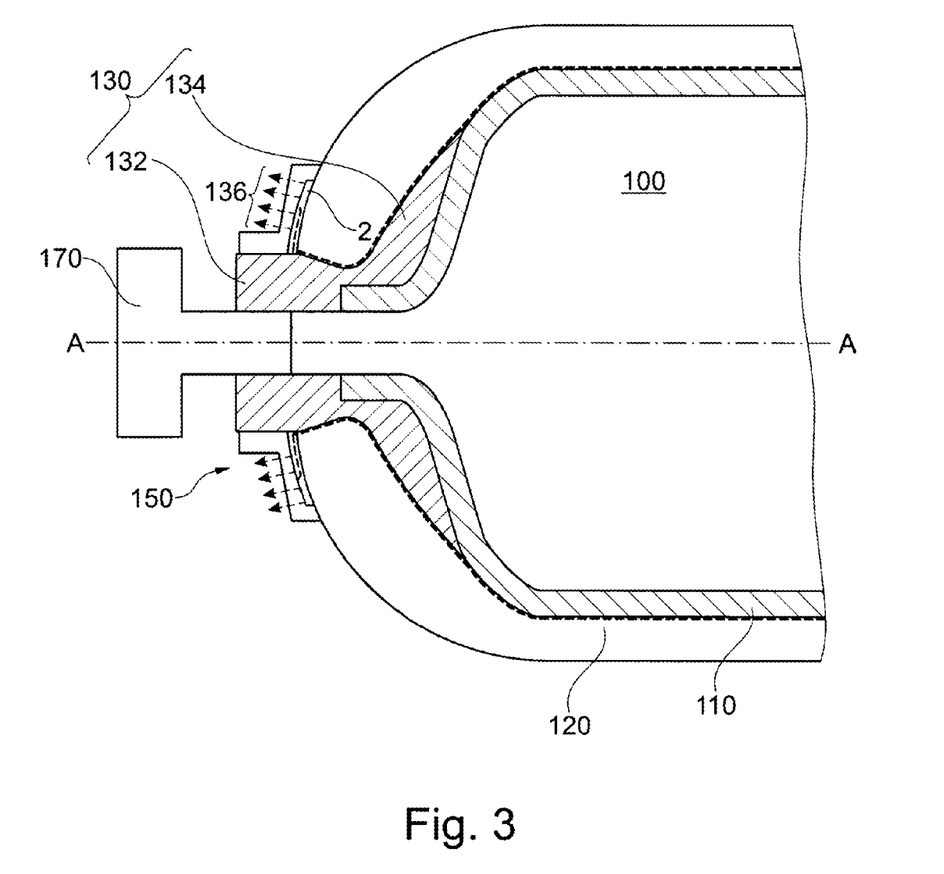
FIG. 3 is a further schematic cross-sectional view of a pressure vessel 100.

FIG. 3 shows a further design embodiment of the technology disclosed here. Only the outlet 150 that is different in comparison to the design embodiment according to FIG. 2 will be discussed hereunder. The outlet 150 here is again designed as a collar 150. However, this is not mandatory.

The collar 150 here comprises a radially widening region in which a fuel sorption reservoir 136 is disposed. The fuel that is to be drained from the interface between the liner 110 and the fiber-reinforced layer 120 here, by way of the duct being configured between the end piece 130 and the fiber-reinforced layer 120, makes its way into the interior of the collar 150 and therein is at least partially received by the fuel sorption reservoir 136. The fuel sorption reservoir 136 has an external surface or fuel exit area, respectively, which can at least be partially passed by an encircling flow, or passed by a throughflow, respectively, of ambient air, preferably of an air stream. The encircling flow/throughflow of ambient air causes the fuel to be dispensed to the environment, wherein this dispensing of fuel that takes place successively is associated with comparatively minor fuel mass flows. As is the case in FIG. 2, the flow of the fuel in the case of FIG. 3 is also directed outward (away from the pressure vessel wall) so that the probability of any thermal stress on the fiber-reinforced layer 120 and/or the liner 110 is reduced.

Instead of a fuel sorption reservoir 136, a fuel-permeable material, in particular a fuel-permeable membrane, a porous material, or a metal fiber material, can likewise be provided. The metal fiber material has a better heat-conducting effect as compared to plastics-material fibers. The underlying concept of this solution is to delay the outflow of fuel to be drained so as to reduce the probability of any thermal stress on the fiber-reinforced layer 120. The fuel-permeable material here configures a multiplicity of microscopic outflow openings which are spaced apart and in terms of their respective fuel mass flow are limited in such a manner that no flame can be created and/or be maintained.

Figure 4:
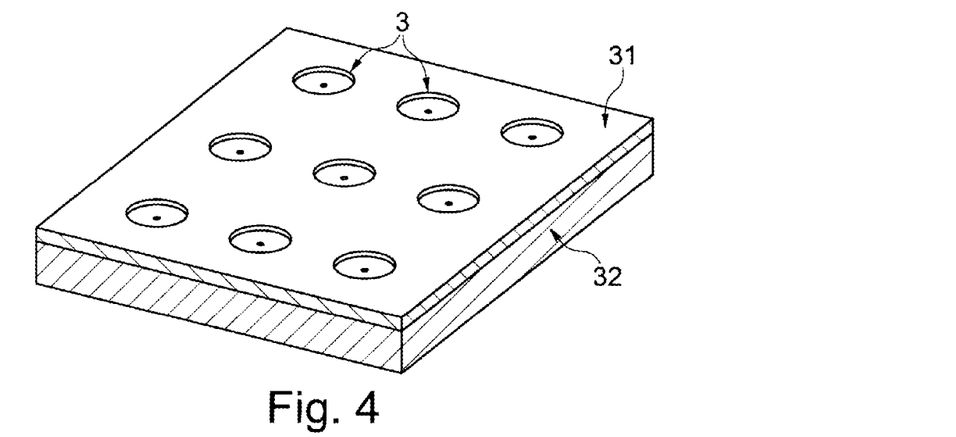
FIGS. 4 to 6 illustrate valves 33 which are received in an elastic layer.
Figure 5:
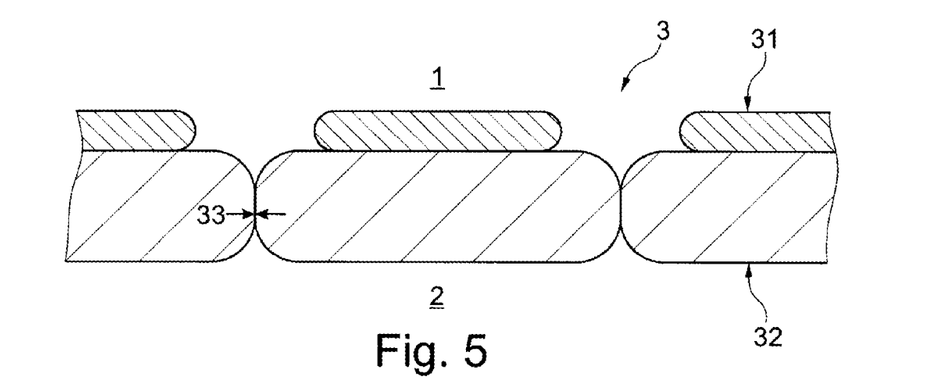
Figure 6:
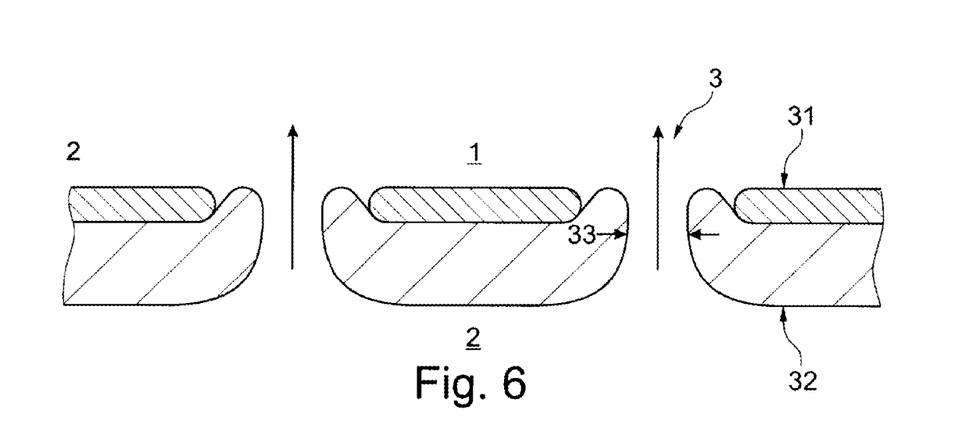

Alternatively or additionally to the fuel-permeable material and the sorption reservoir, a multiplicity of outflow openings 3 can also be provided, as are shown in FIGS. 4 to 6.

FIG. 4 schematically shows a perspective view of a plurality of outflow openings 3 such as can be installed in the pressure vessel systems disclosed here, for example. The individual outflow openings 3 are in each case disposed so as to be mutually spaced apart. Each individual outflow opening 3 can be limited in terms of the mass flow thereof.

FIG. 5 shows an enlarged view when no fuel is to flow out through the outflow openings 3. For example when little fuel makes its way into the interface. The outflow opening 3 here is configured on or in, respectively, a fuel exit area 31 of the outlet. An elastomeric layer 32 is furthermore provided on the outflow openings 3. Holes or perforations, respectively, which in this operational state are closed and here thus form closed valves 33 are configured in the elastomeric layer 32. The fuel thus does not make its way from the fuel-conducting region 2 into the vehicle environment 1. For the sake of simplicity, further components of the pressure vessel system and of the fuel cell system have been omitted.

FIG. 6 shows an enlarged view when the fuel is to flow out through the outflow openings 3. A pressure differential exists between the fuel-conducting region 2 and the environment 1. Said pressure differential has the effect that the closed holes or perforations, respectively, thus the valves 33, open and the fuel can escape through the outflow openings 3. The outflow opening 3 herein is configured by the elastomer material and the punched feature in the surface which represents a rigid external skin. The outflow openings 3 can be configured in such a manner that a maximum fuel mass flow can escape from each of the outflow openings. The maximum fuel mass flow here lies below a fuel mass flow limit value which can maintain a fuel flame and/or permit the latter to be created. In other words, if a pressure increase on account of the permeated hydrogen arises on the hydrogen side 2, the elastic lower layer is deformed on account of the pressure differential such that the outflow openings 3 are released. The rigid external skin herein supports and stabilizes the lower layer.

Figure 7:
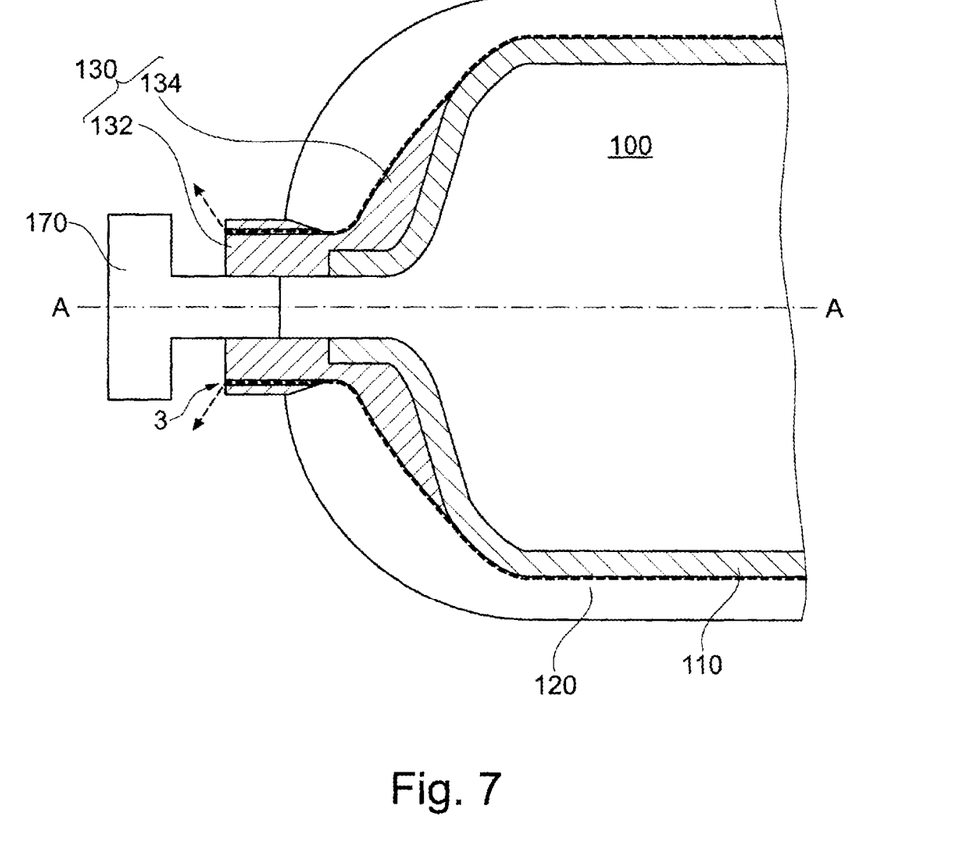
FIG. 7 is a further schematic cross-sectional view of a pressure vessel 100.

FIG. 7 shows a design embodiment in which at least one outflow opening 3 can be designed such as has been discussed in the context of FIG. 2. The at least one outflow opening 3 can in particular be configured as a flame trap. The outflow opening 3, or the outlet 150, respectively, here are configured so as to be heat resistant. The outflow opening 3, or the outlet 150, respectively, can expediently be configured from a metal material (metal or metal alloy, respectively). As is illustrated here, the outlet 150 can also be configured so as to be integral to the end piece. The outlet 150, for discharging fuel that has accumulated in the interface between the liner 110 and the fiber-reinforced layer 120 and is to be drained, can in particular be specified so as to establish a fluidic connection between said interface and the at least one outflow opening 3. The outflow opening 3 is preferably provided in the neck 132 of the end piece that leads out of the pressure vessel. The at least one outflow opening 3 is preferably disposed and oriented such that the fuel to be drained flows from the at least one outlet opening 3 so as to flow away from the external surface of the fiber-reinforced layer 120. Said fuel here initially flows out in a manner coaxial with the pressure vessel longitudinal axis. However, it can also be provided that said fuel flows out at an acute angle to the pressure vessel longitudinal axis A-A, for example. Depending on the details of the environment (for example the geometry and characteristics thereof) an outflow at an obtuse angle to the pressure vessel longitudinal axis can also be purposeful, for example so as to avoid any outflow directly onto an on-tank valve 170.

The exemplary implementations according to FIGS. 2 and 3 as well as 4 to 6 are likewise capable of being combined. In as far as fuel sensors are provided in the immediate environment neighboring the pressure vessel, the probability of any false triggering by said fuel sensors can advantageously be further reduced by way of the technology disclosed here. It is likewise imaginable that the fuel is not dispensed to the environment of the pressure vessel but, optionally upon further preparation, continues to be used.

For reasons of legibility, the expression "at least one" has sometimes been omitted for simplification. If a feature of the technology disclosed here is described in the singular or with the indefinite article (for example the/a pressure vessel, the/an end piece, the/a liner, the/a fiber-reinforced layer, the/a seal, the/an outlet, the/a collar, the/a flame trap, the/an outflow opening, the/a metal fiber material, the/a porous material, the/a detection device, the/a fuel sorption reservoir, etc.) the plural thereof is also intended to be disclosed concomitantly at the same time (for example the at least one pressure vessel, the at least one end piece, the at least one liner, the at least one fiber-reinforced layer, the at least one seal, the at least one outlet, the at least one collar, the at least one flame trap, the at least one outflow opening, the at least one metal fiber material, the at least one porous material, the at least one detection device, the at least one fuel sorption reservoir, etc.).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pressure vessel for storing fuel, comprising:
   a liner;
   a fiber-reinforced layer which at least in regions surrounds the liner;
   an end piece, wherein the end piece is at least in portions covered by the fiber-reinforced layer, wherein the end piece defines a threaded opening, and wherein a thread of a tank valve is screwable into the threaded opening;

at least one outlet for discharging fuel that has accumulated in an interface between the liner and the fiber-reinforced layer and is to be drained, wherein the outlet surrounds the end piece such that the end piece is disposed between a tank valve installed on the pressure vessel and the outlet;

wherein the outlet is disposed and configured such that the fuel to be drained from the interface escapes into the outlet.

2. The pressure vessel as claimed in claim 1, wherein the outlet has at least one flame trap.

3. The pressure vessel as claimed in claim 2, wherein the outlet comprises a heat-resistant material, at least in the region in which the fuel to be drained exits into the environment.

4. The pressure vessel as claimed in claim 3, wherein the outlet is made from a metal material or a ceramic material; and/or the outlet is made from a metal material which has a melting temperature that is higher than the combustion temperature of the fuel.

5. The pressure vessel as claimed in claim 2, wherein at least one gap for draining the fuel to be drained is provided at the outlet, wherein each gap has a maximum gap width of less than 0.64 mm.

6. The pressure vessel as claimed in claim 1, wherein the outlet is configured as a collar, and the collar bears directly or indirectly on an external side of the fiber-reinforced layer.

7. The pressure vessel as claimed in claim 1, wherein the outlet is configured such that an exiting mass flow of fuel to be drained remains below a limit value beyond which a fuel flame is able to be maintained in air; and/or the outlet has at least one outflow opening which is configured such that a mass flow of less than 3.9 micrograms per second escapes from each outflow opening.

8. The pressure vessel as claimed in claim 7, wherein valves are provided at the outflow openings, and the valves are configured to control in an open-loop or closed-loop manner the outflow of fuel.

9. The pressure vessel as claimed in claim 8, wherein the valves are configured as non-return valves which suppress a return flow into a fuel-conducting region.

10. The pressure vessel as claimed in claim 9, wherein the valves are provided in an elastic layer which is configured for releasing the outflow openings when pressure in the fuel-conducting region exceeds a limit value.

11. The pressure vessel as claimed in claim 1, wherein the outlet has at least one outflow opening through which the fuel to be drained exits to the environment, and the outflow opening is configured as a Venturi nozzle.

12. The pressure vessel as claimed in claim 1, wherein the outlet has a multiplicity of outflow openings through which the fuel to be drained exits to the environment, and the multiplicity of outflow openings are of a manner and mutually spaced apart such that the fuel from neighboring outflow openings does not configure any common fuel flame.

13. The pressure vessel as claimed in claim 12, wherein the outlet in a fuel exit area at least in regions comprises a fuel-permeable material, the fuel exits to the environment through the fuel exit area, and the fuel-permeable material configures the multiplicity of outflow openings.

14. The pressure vessel as claimed in claim 13, wherein the fuel-permeable material is one of: a metal-fiber material, a porous material, or a plastics material.

15. The pressure vessel as claimed in claim 13, wherein the at least one outflow opening and/or the fuel-permeable material is disposed so as to be spaced apart from the external surface of the fiber-reinforced layer by at least 10 mm.

16. The pressure vessel as claimed in claim 13, wherein the at least one outflow opening and/or the fuel-permeable material is disposed so as to be spaced apart from the external surface of the fiber-reinforced layer by at least 20 mm.

17. The pressure vessel as claimed in claim 1, further comprising a detection installation for detecting the fuel to be drained.

18. The pressure vessel as claimed in claim 1, wherein the outlet is not fluidically connected to a line system for filling the pressure vessel and/or for retrieving fuel.

* * * * *